United States Patent
Park et al.

(10) Patent No.: US 12,116,439 B2
(45) Date of Patent: Oct. 15, 2024

(54) MODIFIER, MODIFIED CONJUGATED DIENE-BASED POLYMER COMPRISING THEREOF AND METHOD FOR PREPARING THE POLYMER

(71) Applicant: LG Chem, Ltd., Seoul (KR)

(72) Inventors: Hyeon Jong Park, Daejeon (KR); No Ma Kim, Daejeon (KR); Ro Mi Lee, Daejeon (KR)

(73) Assignee: LG Chem, Ltd., Seoul (KR)

(*) Notice: Subject to any disclaimer, the term of this patent is extended or adjusted under 35 U.S.C. 154(b) by 642 days.

(21) Appl. No.: 17/416,181

(22) PCT Filed: Sep. 23, 2020

(86) PCT No.: PCT/KR2020/012811
§ 371 (c)(1),
(2) Date: Jun. 18, 2021

(87) PCT Pub. No.: WO2021/060815
PCT Pub. Date: Apr. 1, 2021

(65) Prior Publication Data
US 2022/0056182 A1    Feb. 24, 2022

(30) Foreign Application Priority Data
Sep. 27, 2019 (KR) .................. 10-2019-0119716

(51) Int. Cl.
*C08F 236/10* (2006.01)
*C07F 7/18* (2006.01)

(52) U.S. Cl.
CPC .......... *C08F 236/10* (2013.01); *C07F 7/1804* (2013.01); *C08F 2800/20* (2013.01); *C08F 2810/40* (2013.01)

(58) Field of Classification Search
CPC ....... C08C 19/25; C08C 19/02; C08F 236/10; C08F 2800/20
See application file for complete search history.

(56) References Cited

U.S. PATENT DOCUMENTS

| 4,397,994 A | 8/1983 | Takeuchi et al. |
| 2008/0103261 A1 | 5/2008 | Tanaka et al. |
| 2009/0203843 A1 | 8/2009 | Fukuoka et al. |
| 2010/0016496 A1 | 1/2010 | Tanaka et al. |
| 2012/0277369 A1 | 11/2012 | Yoshida et al. |
| 2013/0012652 A1 | 1/2013 | Araujo Da Silva et al. |
| 2013/0085225 A1 | 4/2013 | Nishioka et al. |
| 2014/0309363 A1 | 10/2014 | Morita et al. |
| 2016/0177011 A1 | 6/2016 | Kim et al. |
| 2017/0015761 A1 | 1/2017 | Lee et al. |
| 2018/0030070 A1 | 2/2018 | Rossle et al. |
| 2018/0305470 A1* | 10/2018 | Lee ............ C08K 5/56 |
| 2018/0371114 A1 | 12/2018 | Lee et al. |
| 2019/0256635 A1 | 8/2019 | Kim et al. |
| 2020/0002454 A1 | 1/2020 | Lee et al. |
| 2020/0223969 A1 | 7/2020 | Lee et al. |

FOREIGN PATENT DOCUMENTS

| CN | 101495522 A | 7/2009 |
| CN | 105473625 A | 4/2016 |
| CN | 108473620 A | 8/2018 |
| EP | 2752434 B1 | 4/2016 |
| EP | 3296322 A1 | 3/2018 |
| JP | 5705120 B2 | 4/2015 |
| JP | 5994784 B2 | 9/2016 |
| JP | 2017538787 A | 12/2017 |
| JP | 2018531998 A | 11/2018 |
| JP | 2020504213 A | 2/2020 |
| KR | 20090008478 A | 1/2009 |
| KR | 101413791 B1 | 6/2014 |
| KR | 20150141390 A | 12/2015 |
| KR | 20170118794 A | 10/2017 |
| KR | 101857392 B1 | 6/2018 |
| KR | 20180084603 A | 7/2018 |
| KR | 101923160 B1 | 11/2018 |
| RU | 2484104 C2 | 6/2013 |
| RU | 2570882 C2 | 12/2015 |
| RU | 2573870 C2 | 1/2016 |
| TW | 201120073 A | 6/2011 |
| WO | 2011040312 A1 | 4/2011 |
| WO | 2015056898 A1 | 4/2015 |
| WO | 2017111463 A1 | 6/2017 |

OTHER PUBLICATIONS

Sutyagin, V.M., et al., "Chemistry and Physics of Polymers" Textbook, Tomsk, TPU Publishing House, 2003, pp. 1-9.
Kozlov, N.A. et al., "Physics of Polymers" Textbook, Vladimir State University, Vladimir, 2001, pp. 1-10.
Extended European Search Report including Written Opinion for Application No. 20867503.3 dated Feb. 15, 2022, pp. 1-6.
International Search Report for Application No. PCT/KR2020/012811 dated Dec. 24, 2020, pp. 1-3.

* cited by examiner

*Primary Examiner* — Gregory Listvoyb
(74) *Attorney, Agent, or Firm* — Lerner David LLP

(57) ABSTRACT

A modifying conjugated diene-based polymer, a method for preparing the same and a method for preparing the same are disclosed, herein. The modified conjugated diene-based polymer has excellent affinity with a filler and may improve the compounding properties of the conjugated diene-based polymer. In some embodiments, a modified conjugated diene-based polymer including a repeating unit derived from a conjugated diene-based monomer and a functional group derived from a modifier represented by Formula 1 in at least one terminal thereof.

11 Claims, No Drawings

MODIFIER, MODIFIED CONJUGATED DIENE-BASED POLYMER COMPRISING THEREOF AND METHOD FOR PREPARING THE POLYMER

CROSS-REFERENCE TO RELATED APPLICATIONS

The present application is a national phase entry under 35 U.S.C. § 371 of International Application No. PCT/KR2020/012811, filed on Sep. 23, 2020, which claims priority from Korean Patent Application No. 10-2019-0119716, filed on Sep. 27, 2019, the entire contents of which are incorporated by reference herein.

TECHNICAL FIELD

The present invention relates to a modifier useful for modifying a conjugated diene-based polymer, having excellent affinity with a filler and improving the compounding properties of a conjugated diene-based polymer, a modified conjugated diene-based polymer including a functional group derived from the modifier and a method for preparing the polymer.

BACKGROUND ART

According to the recent demand for cars having a low fuel consumption ratio, a conjugated diene-based polymer having modulational stability represented by wet skid resistance as well as low rotation resistance, and excellent abrasion resistance and tensile properties is required as a rubber material for tires.

In order to reduce the rotation resistance of tires, there is a method of reducing hysteresis loss of vulcanized rubber, and rebound resilience at 50° C. to 80° C., tan 5, Goodrich heating, or the like is used as an evaluation index of the vulcanized rubber. That is, it is desirable to use a rubber material having high rebound resilience at the above temperature or a low tan 5 value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene-based polymers or copolymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted and its molecular weight and physical properties may be controlled by coupling or modification. Thus, the SBR prepared by the solution polymerization is widely used as a rubber material for tires because it is easy to change a structure of the finally prepared SBR or BR, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may be reduced by appropriately adjusting the glass transition temperature. The solution-polymerized SBR is prepared by using an anionic polymerization initiator and is being used by coupling or modifying the chain terminals of the polymer thus formed using various modifiers. For example, U.S. Pat. No. 4,397,994 discloses a method of coupling active anions of the chain terminals of a polymer obtained by polymerizing styrene-butadiene using alkyllithium which is a monofunctional initiator in a non-polar solvent, using a coupling agent such as a tin compound.

Meanwhile, as a reinforcing filler of a tire tread, carbon black, silica, etc., are used, and in case of using silica as the reinforcing filler, there are advantages of improving low hysteresis loss and wet skid resistance. However, silica with a hydrophilic surface in contrast to carbon black with a hydrophobic surface has defects of low affinity with rubber and inferior dispersibility, and in order to improve dispersibility or impart silica-rubber with bonding characteristics, a separate silane coupling agent is required. Accordingly, methods of introducing a functional group having affinity or reactivity with silica at the terminal of a rubber molecule have been achieved, but effects thereof are insufficient.

PRIOR ART DOCUMENT (Patent Document 1) U.S. Pat. No. 4,397,994 A

DISCLOSURE OF THE INVENTION

Technical Problem

The present invention has been devised to solve the above-mentioned problems of the conventional technique, and an object is to provide a modified conjugated diene-based polymer which is modified by a modifier represented by Formula 1 and has good processability and excellent tensile strength, abrasion resistance, rotation resistance and wet skid resistance.

In addition, an object of the present invention is to provide a method for preparing the modified conjugated diene-based polymer using a modifier represented by Formula 1.

Also, an object of the present invention is to provide a modifier represented by Formula 1, which is useful for the modification of a conjugated diene-based polymer, has excellent affinity with a filler and may improve the compounding properties of the conjugated diene-based polymer.

Technical Solution

To solve the above-described tasks, according to an embodiment of the present invention, the present invention provides a modified conjugated diene-based polymer including a repeating unit derived from a conjugated diene-based monomer, and a functional group derived from a modifier represented by the following Formula 1 in at least one terminal:

[Formula 1]

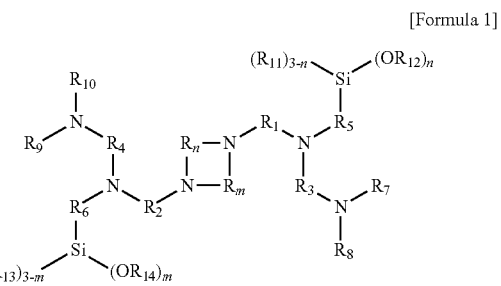

in Formula 1, $R_1$ to $R_6$ are each independently an alkylene group of 1 to 20 carbon atoms, an alkenylene group of 2 to 20 carbon atoms, an alkynylene group of 2 to 20 carbon atoms, a cycloalkylene group of 5 to 30 carbon atoms, a cycloalkenylene group of 5 to 30 carbon atoms, a heteroalkylene group of 1 to 20 carbon atoms, an arylene group of 6 to 30 carbon atoms, or a heteroarylene group of 5 to 30 carbon atoms, $R_7$ to $R_{10}$ are each independently an alkyl group of 1 to 20 carbon atoms, an alkenyl group of 2 to 20 carbon atoms, an alkynyl group of 2 to 20 carbon atoms, a cycloalkyl group of 5 to 30 carbon atoms, a cycloalkenyl group of 5 to 30 carbon atoms, a heteroalkyl group of 1 to 20 carbon atoms, an aryl group of 6 to 30 carbon atoms, a heteroaryl group of 5 to 30 carbon atoms, or $-R_{a1}-Si(OR_{a2})_a(R_{a3})_{3-a}$, where $R_{a1}$ is an alkylene group of 1 to 10 carbon atoms, $R_{a2}$ and $R_{a3}$ are alkyl groups of 1 to 10 carbon atoms, and a is an integer selected from 0 to 3, $R_{11}$ to $R_{14}$ are each independently an alkyl group of 1 to 20 carbon atoms, or an aryl group of 6 to 20 carbon atoms, $R_m$ and $R_n$ are each independently an alkylene group of 1 to 3 carbon atoms, or an alkenylene group of 2 to 4 carbon atoms, m and n are integers selected from 1 to 3, and a hydrocarbon group or a hetero hydrocarbon group defined in $R_1$ to $R_{14}$, $R_m$ and $R_n$ is unsubstituted or substituted with a substituent, wherein the substituent is an alkyl group of 1 to 10 carbon atoms, an alkenyl group of 2 to 10 carbon atoms, an alkynyl group of 2 to 10 carbon atoms, a cycloalkyl group of 5 to 20 carbon atoms, a cycloalkenyl group of 5 to 20 carbon atoms, a heteroalkyl group of 1 to 10 carbon atoms, an aryl group of 6 to 20 carbon atoms, or a heteroaryl group of 5 to 20 carbon atoms.

In addition, the present invention provides a method for preparing the modified conjugated diene-based polymer, including: polymerizing a conjugated diene-based monomer, or an aromatic vinyl-based monomer and a conjugated diene-based monomer in a hydrocarbon solvent including an organometallic compound to prepare an active polymer coupled with an organometal (Si); and reacting the active polymer with a modifier represented by Formula 1 above (S2).

Also, the present invention provides a modifier represented by the following Formula 1:

[Formula 1]

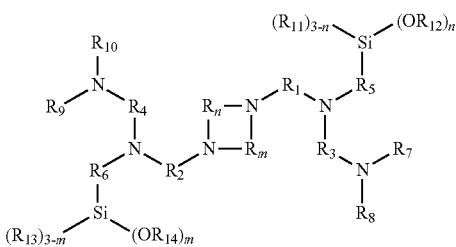

in Formula 1,
$R_1$ to $R_6$ are each independently an alkylene group of 1 to 20 carbon atoms, an alkenylene group of 2 to 20 carbon atoms, an alkynylene group of 2 to 20 carbon atoms, a cycloalkylene group of 5 to 30 carbon atoms, a cycloalkenylene group of 5 to 30 carbon atoms, a heteroalkylene group of 1 to 20 carbon atoms, an arylene group of 6 to 30 carbon atoms, or a heteroarylene group of 5 to 30 carbon atoms,

Advantageous Effects

The modified conjugated diene-based polymer according to the present invention includes a functional group derived from a modifier represented by Formula 1, and may have excellent affinity with a filler and improved compounding properties, and as a result, show good processability and excellent tensile strength, abrasion resistance, rotation resistance and wet skid resistance.

In addition, the modifier including a plurality of functional groups derived from an amine according to the present invention has high anionic reactivity and may easily act with the active part of a polymer, and accordingly, may easily modify the polymer.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries, and the words or terms should be interpreted as having a meaning that is consistent with their meaning of the technical idea of the invention, based on the principle that an inventor may properly define the meaning of the words or terms to best explain the invention.

Definition of Terms

The term "substituted" used in the present invention may mean that the hydrogen of a functional group, an atomic group or a compound is substituted with a specific substituent. If the hydrogen of a functional group, an atomic group or a compound is substituted with a specific substituent, one or a plurality including two or more of substituents may be present according to the number of hydrogen present in the functional group, the atomic group or the compound, and if a plurality of substituents are present, each substituent may be the same or different.

The term "alkyl group" in the present invention may mean monovalent aliphatic saturated hydrocarbon, and may include a linear alkyl group such as methyl, ethyl, propyl and butyl, and a branched alkyl group such as isopropyl, sec-butyl, tert-butyl and neo-pentyl.

The term "alkylene group" used in the present invention may mean divalent aliphatic saturated hydrocarbon such as methylene, ethylene, propylene and butylene.

The term "alkylsilyl group" used in the present invention may include all monoalkylsilyl, dialkylsilyl and trialkylsilyl.

The term "alkenyl group" used in the present invention may mean an alkyl group including one or two or more double bonds.

The term "alkynyl group" used in the present invention may mean an alkyl group including one or two or more triple bonds.

The term "alkoxy group" used in the present invention may include all the functional group, atomic group or compounds of an alkyl group of which terminal hydrogen is substituted with oxygen, such as methoxy, ethoxy, propoxy and butoxy.

The term "heteroalkyl group" used in the present invention may mean an alkyl group in which carbon atoms (excluding terminal carbon) are substituted with one or more heteroatoms.

The term "cycloalkyl group" used in the present invention may mean cyclic saturated hydrocarbon.

The term "aryl group" used in the present invention may mean aromatic hydrocarbon, and may include both monocyclic aromatic hydrocarbon in which one ring is formed, and polycyclic aromatic hydrocarbon in which two or more rings are bonded.

The term "heterocyclic group" used in the present invention may include both a cycloalkyl group and an aryl group in which carbon atoms in the cycloalkyl group or the aryl group are substituted with one or more heteroatoms.

The term "aralkyl" used in the present invention means an alkyl group in which one or more aryl groups are definitely substituted.

The term "single bond" in the present invention may mean a single covalent bond itself excluding a separate atomic or molecular group.

The term "derived unit" and "derived functional group" in the present invention may represent a component or a structure comes from a certain material, or the material itself.

Modified Conjugated Diene-Based Polymer

The present invention provides a modified conjugated diene-based polymer including a functional group derived from a modifier represented by Formula 1.

The modified conjugated diene-based polymer according to an embodiment of the present invention is characterized in including a repeating unit derived from a conjugated diene-based monomer, and including a functional group derived from a modifier represented by Formula 1 below in at least one terminal.

[Formula 1]

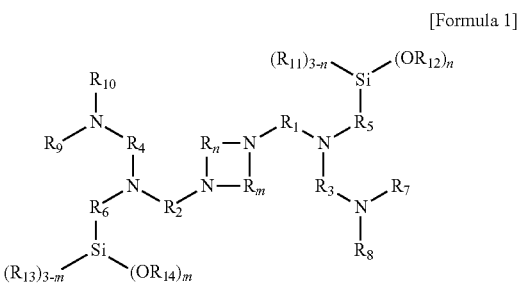

In Formula 1, $R_1$ to $R_6$ are each independently an alkylene group of 1 to 20 carbon atoms, an alkenylene group of 2 to 20 carbon atoms, an alkynylene group of 2 to 20 carbon atoms, a cycloalkylene group of 5 to 30 carbon atoms, a cycloalkenylene group of 5 to 30 carbon atoms, a heteroalkylene group of 1 to 20 carbon atoms, an arylene group of 6 to 30 carbon atoms, or a heteroarylene group of 5 to 30 carbon atoms, $R_7$ to $R_{10}$ are each independently an alkyl group of 1 to 20 carbon atoms, an alkenyl group of 2 to 20 carbon atoms, an alkynyl group of 2 to 20 carbon atoms, a cycloalkyl group of 5 to 30 carbon atoms, a cycloalkenyl group of 5 to 30 carbon atoms, a heteroalkyl group of 1 to 20 carbon atoms, an aryl group of 6 to 30 carbon atoms, a heteroaryl group of 5 to 30 carbon atoms, or $-R_{a1}-Si(OR_{a2})_a(R_{a3})_{3-a}$, where $R_{a1}$ is an alkylene group of 1 to 10 carbon atoms, $R_{a2}$ and $R_{a3}$ are alkyl groups of 1 to 10 carbon atoms, and a is an integer selected from 0 to 3, $R_{11}$ to $R_{14}$ are each independently an alkyl group of 1 to 20 carbon atoms, or an aryl group of 6 to 20 carbon atoms, $R_m$ and $R_n$ are each independently an alkylene group of 1 to 3 carbon atoms, or an alkenylene group of 2 to 4 carbon atoms, m and n are integers selected from 1 to 3, and a hydrocarbon group or a hetero hydrocarbon group defined in $R_{11}$ to $R_{14}$, $R_m$ and $R_n$ is unsubstituted or substituted with a substituent, wherein the substituent is an alkyl group of 1 to 10 carbon atoms, an alkenyl group of 2 to 10 carbon atoms, an alkynyl group of 2 to 10 carbon atoms, a cycloalkyl group of 5 to 20 carbon atoms, a cycloalkenyl group of 5 to 20 carbon atoms, a heteroalkyl group of 1 to 10 carbon atoms, an aryl group of 6 to 20 carbon atoms, or a heteroaryl group of 5 to 20 carbon atoms.

Particularly, in Formula 1, $R_1$ to $R_6$ are each independently an alkylene group of 1 to 10 carbon atoms, an alkenylene group of 2 to 10 carbon atoms, a cycloalkylene group of 5 to 20 carbon atoms, a heteroalkylene group of 1 to 10 carbon atoms, an arylene group of 6 to 20 carbon atoms, or a heteroarylene group of 5 to 20 carbon atoms.

In addition, $R_7$ to $R_{10}$ are each independently is an alkyl group of 1 to 10 carbon atoms, an alkenyl group of 2 to 10 carbon atoms, a cycloalkyl group of 5 to 20 carbon atoms, a heteroalkyl group of 1 to 10 carbon atoms, an aryl group of 6 to 20 carbon atoms, a heteroaryl group of 5 to 20 carbon atoms, or $-R_{a1}-Si(OR_{a2})_a(R_{a3})_{3-a}$, where $R_{a1}$ is an alkylene group of 1 to 10 carbon atoms, $R_{a2}$ and $R_{a3}$ are alkyl groups of 1 to 10 carbon atoms, and a is an integer selected from 0 to 3.

In addition, $R_{11}$ to $R_{14}$ are each independently an alkyl group of 1 to 10 carbon atoms, or an aryl group of 6 to 10 carbon atoms, $R_m$ and $R_n$ are each independently an alkylene group of 1 to 2 carbon atoms or an alkenylene group of 2 carbon atoms, and m and n are integers selected from 1 to 3.

Also, a hydrocarbon group or a hetero hydrocarbon group defined in $R_1$ to $R_{14}$, $R_m$ and $R_n$ is unsubstituted or substituted with a substituent, and the substituent is an alkyl group of 1 to 10 carbona toms, an alkenyl group of 2 to 10 carbona toms, a cycloalkyl group of 5 to 20 carbon atoms, a heteroalkyl group of 1 to 10 carbon atoms, an aryl group of 6 to 20 carbon atoms, or a heteroaryl group of 5 to 20 carbon atoms.

In detail, the compound represented by Formula 1 may be one or more selected from the compounds represented by Formula 1a to Formula 1e below.

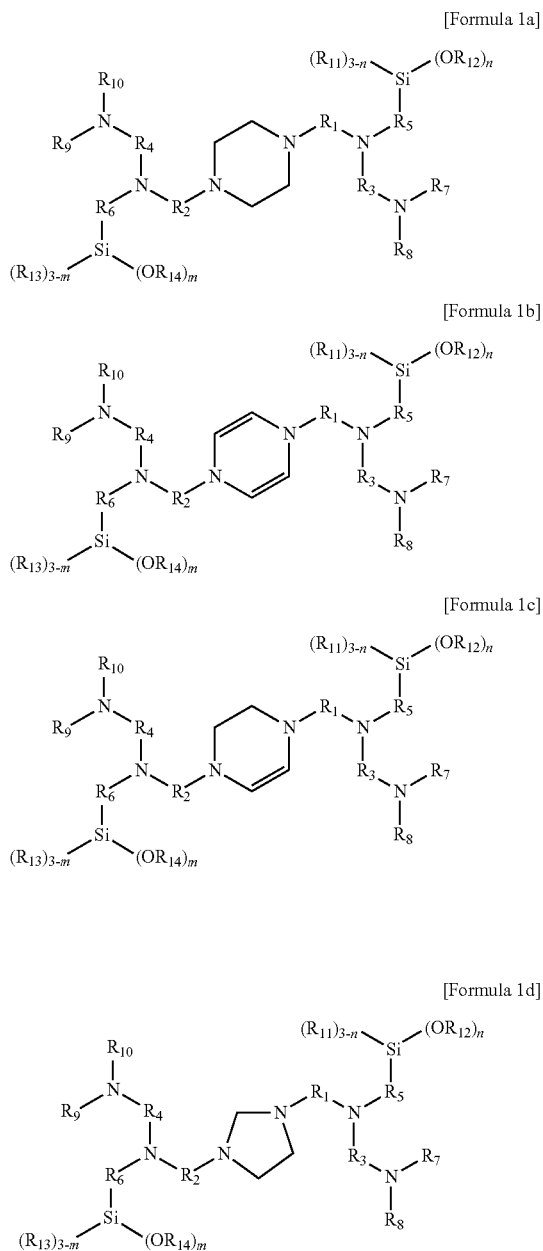

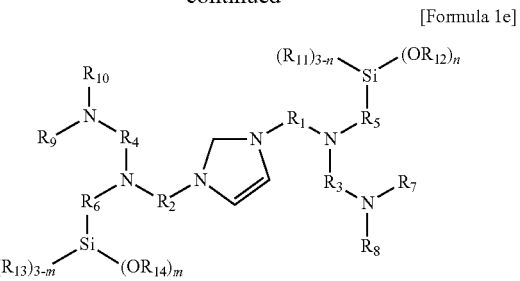

In Formula 1a to Formula 1e above, the definition of $R_{11}$ to $R_{14}$, m and n is the same as defined in Formula 1.

More particularly, in Formula 1, and Formula 1a to Formula 1e, $R_1$ to $R_6$ are each independently an alkylene group of 1 to 10 carbon atoms, an alkenylene group of 2 to 10 carbon atoms, a cycloalkylene group of 5 to 20 carbon atoms, or an arylene group of 6 to 20 carbon atoms.

In addition, $R_7$ to $R_{10}$ are each independently an alkyl group of 1 to 10 carbon atoms, a cycloalkyl group of 5 to 20 carbon atoms, a heteroalkyl group of 1 to 10 carbon atoms, an aryl group of 6 to 30 carbon atoms, or a heteroaryl group of 5 to 20 carbon atoms.

In addition, $R_{11}$ to $R_{14}$ are each independently an alkyl group of 1 to 10 carbon atoms, or an aryl group of 6 to 10 carbon atoms, $R_m$ and $R_n$ are each independently a methylene group, an ethylene group or an ethenylene group, and m and n are integers selected from 1 to 3.

Also, a hydrocarbon group or a hetero hydrocarbon group defined in $R_{11}$ to $R_{14}$ is unsubstituted or substituted with a substituent, and the substituent is an alkyl group of 1 to 10 carbon atoms, a heteroalkyl group of 1 to 10 carbon atoms, or an aryl group of 6 to 20 carbon atoms.

More particularly, in Formula 1, and Formula 1a to Formula 1e, $R_1$ to $R_6$ are each independently an alkylene group of 1 to 5 carbon atoms, an alkenylene group of 2 to 5 carbon atoms, a cycloalkylene group of 5 to 10 carbon atoms, or an arylene group of 6 to 10 carbon atoms.

In addition, $R_7$ to $R_{10}$ are each independently is an alkyl group of 1 to 5 carbon atoms, a cycloalkyl group of 5 to 10 carbon atoms, a heteroalkyl group of 1 to 5 carbon atoms, an aryl group of 6 to 10 carbon atoms, or a heteroaryl group of 5 to 10 carbon atoms.

In addition, $R_{11}$ to $R_{14}$ are each independently an alkyl group of 1 to 5 carbon atoms, or an aryl group of 6 to 10 carbon atoms, $R_m$ and $R_n$ are each independently a methylene group, an ethylene group or an ethenylene group, and m and n are integers selected from 1 to 3.

Also, a hydrocarbon group or a hetero hydrocarbon group defined in $R_{11}$ to $R_{14}$, $R_m$ and $R_n$ are unsubstituted or substituted with a substituent, and the substituent is an alkyl group of 1 to 5 carbon atoms, a heteroalkyl group of 1 to 5 carbon atoms, or an aryl group of 6 to 10 carbon atoms.

The modifier represented by Formula 1 is a compound including six functional groups derived from amine including a heterocycle containing two nitrogen atoms in a core in a molecule, and including two or more alkoxysilane functional groups, and assists a lot with the improvement of affinity with a filler, improves processability and is expected to improve rotation resistance properties owing to the increase of linearity.

Particularly, since a cyclic N atom-containing heterocycle is present at the center of a molecule as a core, and four amino groups are further included in the molecule, even better affinity with a filler may be expected, and since all the six amino groups and the alkoxysilane groups are not directly connected via single bonds but have hydrocarbon groups as connecting groups, interaction probability with the filler may be improved due to the relatively free movement of hydrocarbon bonds, and even better affinity with a filler may be achieved. In addition, since the number of the alkoxysilane group is two, the improving effects of linearity may be achieved, and the improvement of processability may be expected.

In addition, in case of increasing the number of the alkoxysilane group, symmetric increase of the alkoxysilane group is preferable. If the alkoxysilane functional group increases at any one moiety, it is apprehended that linearity may decrease, and the modifier is required to be applied with this point in mind.

According to an embodiment of the present invention, the modifier represented by Formula 1 may be one or more selected from the compounds represented by Formula 1-1 to Formula 1-10 below.

[Formula 1-1]

[Formula 1-2]

[Formula 1-3]

[Formula 1-4]

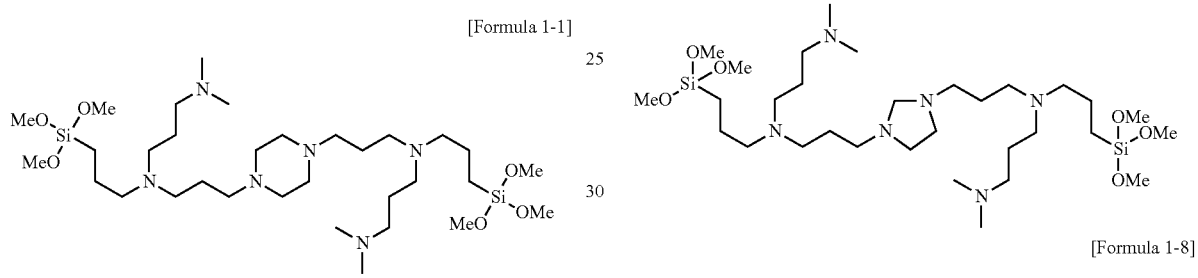

[Formula 1-5]

[Formula 1-6]

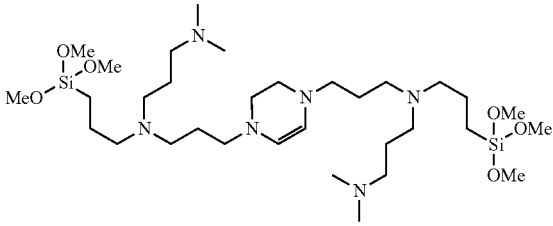

[Formula 1-7]

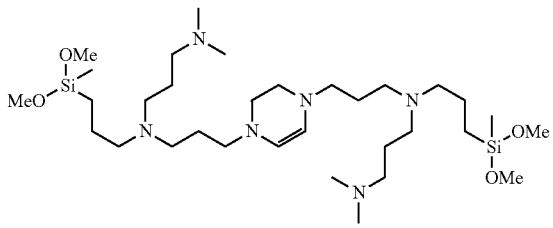

[Formula 1-8]

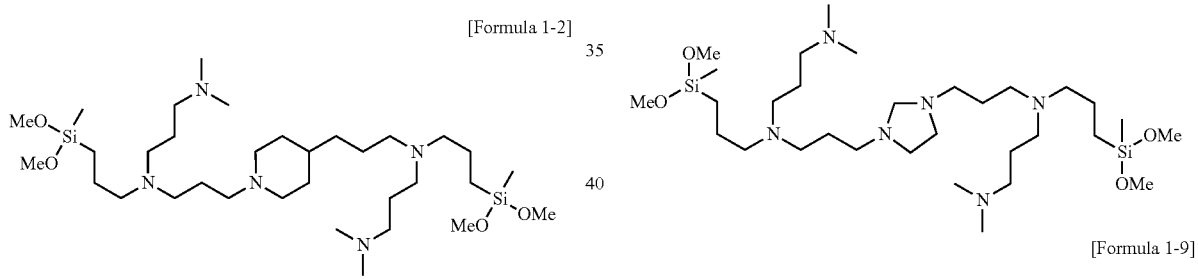

[Formula 1-9]

[Formula 1-10]

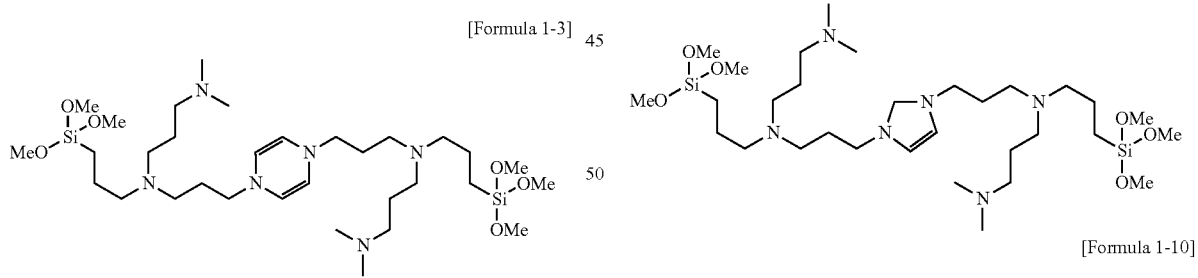

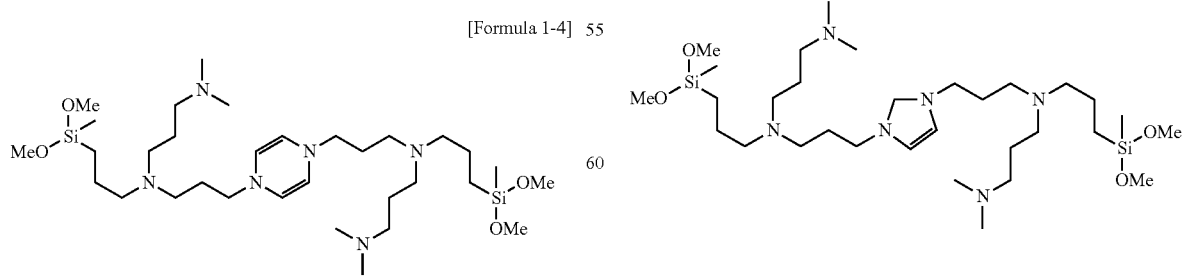

In Formula 1-1 to Formula 1-10, Me is a methyl group.

Meanwhile, the modifier represented by Formula 1 according to an embodiment of the present invention may be prepared by common organic synthesis. For example, the modifier represented by Formula 1 may be prepared by reacting Formula a and Formula b below in the presence of a polar aprotic organic solvent under an inert atmosphere to prepare an intermediate represented by Formula c, and reacting the intermediate and Formula d in the presence of a polar aprotic organic solvent under an inert atmosphere.

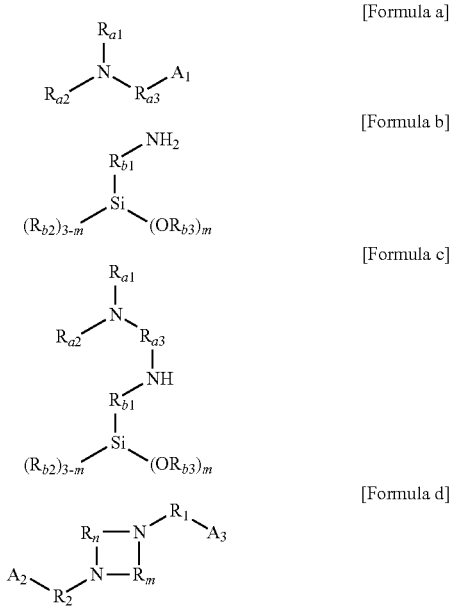

In Formula a to Formula d,

Each of $R_{a1}$ and $R_{a2}$ is the same as the definition of $R_9$ and $R_{10}$ in Formula 1, $R_{10}$ is the same as the definition of $R_4$ in Formula 1, $R_{b1}$ is the same as the definition of $R_6$ in Formula 1, each of $R_{b2}$ and $R_{b3}$ is the same as the definition of $R_{13}$ and $R_{14}$ in Formula 1, $R_1$ to $R_4$ and X are the same as defined in Formula 1, each of $A_1$ to $A_3$ is Br or Cl, and $R_1$, $R_2$, $R_n$, $R_m$ and m are the same as defined in Formula 1.

In addition, Formula a with Formula b, and the intermediate represented by Formula c with Formula d may be reacted in suitable ratios for smooth reaction considering stoichiometry, and for example, Formula a and Formula b may be reacted in a molar ratio of 1:1 to 1:5, and the intermediate represented by Formula c and Formula d may be reacted in a molar ratio of 1:1 to 1:5. However, under sufficient reaction activity conditions, it is preferable that Formula a with Formula b, and Formula c with Formula d are reacted in a ratio nearly the molar ratio of 1:1 in view of easy separation of unreacted reactants.

In addition, the polar aprotic organic solvent is not specifically limited and may be, for example, one or more selected from the group consisting of pyridine, acetonitrile, ethyl acetate, dimethyl sulfoxide (DMSO) and dimethylformamide (DMF).

The repeating unit derived from a conjugated diene-based monomer may mean a repeating unit formed by a conjugated diene-based monomer during polymerization, and the conjugated diene-based monomer may be, for example, one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom).

Meanwhile, the modified conjugated diene-based copolymer may further include, for example, a repeating unit derived from an aromatic vinyl monomer together with the repeating unit derived from the conjugated diene-based monomer.

The repeating unit derived from the aromatic vinyl monomer may mean a repeating unit formed by the aromatic vinyl monomer during polymerization, and the aromatic vinyl monomer may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

If the modified conjugated diene-based polymer is a copolymer including the repeating unit derived from the aromatic vinyl monomer, the modified conjugated diene-based polymer may include the repeating unit derived from the conjugated diene-based monomer in an amount of at least 20 wt %, 30 wt %, 40 wt %, 50 wt %, 55 wt % or 60 wt %, and at most 95 wt %, 90 wt % or 80 wt %, and may include the repeating unit derived from the aromatic vinyl monomer of at least 5 wt %, 10 wt %, or 20 wt %, and at most 80 wt %, 70 wt %, 60 wt %, 55 wt %, 50 wt %, 45 wt %, or 40 wt %. Within these ranges, excellent effects of rotation resistance, wet skid resistance and abrasion resistance may be achieved.

According to an embodiment of the present invention, the copolymer may be a random copolymer, and in this case, effects of excellent balance between physical properties may be achieved. The random copolymer may mean the arrangement of repeating units forming a copolymer in disorder.

The modified conjugated diene-based polymer according to an embodiment of the present invention may have a number average molecular weight (Mn) of 10,000 g/mol to 2,000,000 g/mol, 50,000 g/mol to 1,800,000 g/mol or 120,000 g/mol to 1,500,000 g/mol, and a weight average molecular weight (Mw) of 10,000 g/mol to 5,000,000 g/mol, 100,000 g/mol to 3,500,000 g/mol, or 120,000 g/mol to 2,000,000 g/mol, and within these ranges, excellent effects of rotation resistance and wet skid resistance may be achieved. In another embodiment, the modified conjugated diene-based polymer may have molecular weight distribution (Mw/Mn) of 1.0 to 8.0, 1.0 to 4.0, or 1.0 to 3.5, and within this range, balance between physical properties may be excellent.

Here, the weight average molecular weight (Mw) and the number average molecular weight (Mn) are polystyrene converted molecular weights analyzed by gel permeation chromatography (GPC), and the molecular weight distribution (Mw/Mn) is also referred to as polydispersity and is calculated as a ratio (Mw/Mn) of the weight average molecular weight (Mw) and the number average molecular weight (Mn).

In another embodiment, the modified conjugated diene-based polymer may have a mooney viscosity of 20 to 150 at 100° C., 20 to 150 at 140° C., and within this range, processability and productivity may be excellent.

Here, the mooney viscosity was measured by using a mooney viscometer, for example, MV2000E (ALPHA Technologies Co.) using Large Rotor at a rotor speed of 2±0.02 rpm at 100° C. and 140° C. Particularly, a polymer was stood at room temperature (23±5° C.) for 30 minutes or more, and 27±3 g was collected and put in a die cavity, and then, measurement was conducted while operating Platen and applying torque.

In addition, the modified conjugated diene-based polymer may have the vinyl content of 5 wt % or more, 10 wt % or more, or 10 wt % to 60 wt %, and within this range, glass transition temperature may be controlled in a suitable range, and excellent effects of rotation resistance, wet skid resistance and low consumption ratio may be achieved. Here, the vinyl content may mean the amount of a not 1,4-added but 1,2-added conjugated diene-based monomer with respect to 100 wt % of a conjugated diene-based copolymer composed of a monomer having a vinyl group and an aromatic vinyl-based monomer.

Meanwhile, the term "derived repeating unit", "derived functional group" and "derived group" used in the present invention may represent a component or a structure comes from a certain material, or the material itself.

Method for Preparing Modified Conjugated Diene-Based Polymer

In addition, the present invention provides a method for preparing the modified conjugated diene-based polymer.

The method for preparing the modified conjugated diene-based polymer according to an embodiment of the present invention is characterized in including: polymerizing a conjugated diene-based monomer, or an aromatic vinyl-based monomer and a conjugated diene-based monomer in a hydrocarbon solvent including an organometallic compound to prepare an active polymer coupled with an organometal (step S1); and reacting the active polymer with a modifier including a compound represented by Formula 1 below (step S2).

[Formula 1]

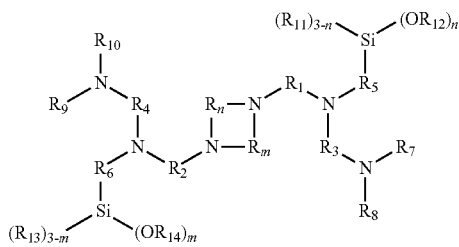

The definition on each substituent of Formula 1 is the same as that above.

Step 1 is a step for preparing an active polymer coupled with an organometallic compound and may be performed by polymerizing a conjugated diene-based monomer, or an aromatic vinyl-based monomer and a conjugated diene-based monomer in a hydrocarbon solvent including an organometallic compound.

The hydrocarbon solvent is not specifically limited and may be, for example, one or more selected from the group consisting of n-pentane, n-hexane, n-heptane, isooctane, cyclohexane, toluene, benzene and xylene.

The conjugated diene-based monomer and the aromatic vinyl-based monomer are the same as defined above.

According to an embodiment of the present invention, the organometallic compound may be used in 0.01 mmol to 10 mmol, 0.05 mmol to 5 mmol, 0.1 mmol to 2 mmol, or 0.1 mmol to 1 mmol based on total 100 g of the monomer.

The organometallic compound may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

Meanwhile, the polymerization of step 1 may be performed by including a polar additive, and the polar additive may be added in 0.001 g to 50 g, 0.001 g to 10 g, or 0.005 g to 0.1 g based on total 100 g of the monomer. In addition, the polar additive may be one or more selected from the group consisting of tetrahydrofuran, 2,2-di(tetrahydrofuryl) propane, diethyl ether, cyclopentyl ether, dipropyl ether, ethylene dimethyl ether, diethyl glycol, dimethyl ether, tert-butoxy ethoxy ethane, bis(3-dimethylaminoethyl)ether, (dimethylaminoethyl) ethyl ether, trimethylamine, triethylamine, tripropylamine, and tetramethylethylenediamine, particularly, triethylamine or tetramethylethylenediamine. If the polar additive is included, and if a conjugated diene-based monomer, or a conjugated diene-based monomer and an aromatic vinyl-based monomer are copolymerized, the difference of their reaction rates may be compensated, and effects of inducing easy formation of a random copolymer may be achieved.

The polymerization of step 1 may be, for example, anionic polymerization, and particularly, living anionic polymerization by which an anionic active part is included at the polymerization terminal through propagation polymerization reaction by anions. In addition, the polymerization of step 1 may be polymerization with heating, isothermal polymerization, or polymerization at a constant temperature (adiabatic polymerization). The polymerization at a constant temperature means a polymerization method including a step of polymerizing using self-generated heat of reaction without optionally applying heat after adding the organometallic compound, and the polymerization with heating means a polymerization method including injecting the organometallic compound and then, increasing the temperature by optionally applying heat. The isothermal polymerization means a polymerization method by which the temperature of a polymer is kept constant by increasing heat by applying heat or taking heat after adding the organometallic compound.

In addition, the polymerization of step 1 may be performed in a temperature range of, for example, −20° C. to 200° C., 0° C. to 150° C., or 10° C. to 120° C.

The active polymer prepared by step 1 may mean a polymer in which a polymer anion and an organometallic cation are coupled.

The step 2 is a step of reacting the active polymer with the modifier represented by Formula 1 for preparing a modified conjugated diene-based polymer.

According to an embodiment of the present invention, the modifier represented by Formula 1 may be used in an amount of 0.01 mmol to 10 mmol, 0.01 mmol to 5 mmol, or 0.02 mmol to 3 mmol based on total 100 g of the monomer.

In addition, according to an embodiment of the present invention, the modifier represented by Formula 1 and the organometallic compound may be used in a molar ratio of 1:0.1 to 1:10, a molar ratio of 1:0.1 to 1:5, or a molar ratio of 1:0.2 to 1:3, and within this range, modification reaction of optimized performance may be carried out, and a conjugated diene-based polymer with a high modification ratio may be obtained.

The reaction of step 2 is modification reaction for introducing a functional group derived from the modifier into the active polymer and may be performed at 0° C. to 90° C. for 1 minute to 5 hours.

In addition, according to an embodiment of the present invention, the preparation method of the modified conjugated diene-based polymer may be performed by a polymerization method of a batch type or a continuous type polymerization method including one or more reactors.

The method for preparing the modified conjugated diene-based polymer may further include, for example, one or more steps of recovering solvents and unreacted monomers and drying, after step 2 of the present invention, as necessary.

Modifier

Also, the present invention provides a modifier which is useful for modifying a polymer, particularly, a conjugated diene-based polymer, has excellent affinity with a filler and may impart a polymer with excellent compounding properties.

The modifier according to an embodiment of the present invention is characterized in being represented by Formula 1 below.

[Formula 1]

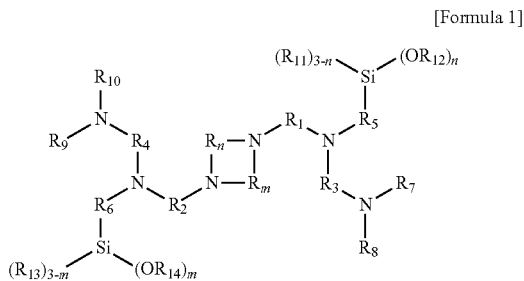

The definition on each substituent of Formula 1 is the same as defined above.

Rubber Composition

Further, the present invention provides a rubber composition including the modified conjugated diene-based polymer.

The rubber composition according to an embodiment of the present invention may include the modified conjugated diene-based polymer in an amount of 10 wt % or more, 10 wt % to 100 wt %, or 20 wt % to 90 wt %, and within this range, mechanical properties such as tensile strength and abrasion resistance are excellent, and effects of excellent balance between physical properties may be achieved.

In addition, the rubber composition may further include other rubber components, as necessary, in addition to the modified conjugated diene-based polymer, and in this case, the rubber component may be included in an amount of 90 wt % or less based on the total weight of the rubber composition. In a particular embodiment, the other rubber component may be included in an amount of 1 part by weight to 900 parts by weight based on 100 parts by weight of the modified conjugated diene-based polymer.

The rubber component may be, for example, natural rubber or synthetic rubber, and may particularly be natural rubber (NR) including cis-1,4-polyisoprene; modified natural rubber which is obtained by modifying or purifying common natural rubber, such as epoxidized natural rubber (ENR), deproteinized natural rubber (DPNR), and hydrogenated natural rubber; and synthetic rubber such as a styrene-butadiene copolymer (SBR), polybutadiene (BR), polyisoprene (IR), butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acryl rubber, urethane rubber, silicone rubber, epichlorohydrin rubber and halogenated butyl rubber, and any one among them or mixtures of two or more thereof may be used.

The rubber composition may include a filler in 0.1 parts by weight to 200 parts by weight, or 10 parts by weight to 120 parts by weight based on 100 parts by weight of the modified conjugated diene-based polymer of the present invention. The filler may be, for example, a silica-based filler, particularly, wet silica (hydrated silicate), dry silica (anhydrous silicate), calcium silicate, aluminum silicate, or colloid silica. Preferably, the filler may be wet silica which has the most significant improving effects of destruction characteristics and compatible effects of wet grip. In addition, the rubber composition may further include a carbon-based filler, as necessary.

In another embodiment, if silica is used as the filler, a silane coupling agent may be used together for the improvement of reinforcing and low exothermic properties. Particular examples of the silane coupling agent may include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one among them or mixtures of two or more thereof may be used. Preferably, bis(3-triethoxysilylpropyl)polysulfide or 3-trimethoxysilylpropylbenzothiazyltetrasulfide may be used in consideration of the improving effects of reinforcing properties.

In addition, in the rubber composition according to an embodiment of the present invention, since a modified conjugated diene-based polymer in which a functional group having high affinity with silica is introduced into an active part is used as a rubber component, the compounding amount of the silane coupling agent may be smaller than a common case. Thus, the silane coupling agent may be used in an amount of 1 part by weight to 20 parts by weight, or 5 parts by weight to 15 parts by weight based on 100 parts by weight of silica. Within the above amount range, effects as a coupling agent may be sufficiently exhibited, and preventing effects of gelation of a rubber component may be achieved.

The rubber composition according to an embodiment of the present invention may be sulfur crosslinkable, and so may further include a vulcanizing agent. The vulcanizing agent may particularly be a sulfur powder and may be included in an amount of 0.1 parts by weight to 10 parts by weight based on 100 parts by weight of the rubber component. Within the above amount range, elasticity and strength required for a vulcanized rubber composition may be secured, and at the same time, an excellent low fuel consumption ratio may be achieved.

The rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator may include, for example, thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG), in an amount of 0.1 parts by weight to 5 parts by weight based on 100 parts by weight of the rubber component.

The process oil acts as a softener in a rubber composition and may include, for example, a paraffin-based, naphthene-based, or aromatic compound. An aromatic process oil may be used in consideration of tensile strength and abrasion resistance, and a naphthene-based or paraffin-based process oil may be used in consideration of hysteresis loss and properties at a low temperature. The process oil may be included in an amount of 100 parts by weight or less based on 100 parts by weight of the rubber component. Within the above-described range, the deterioration of the tensile strength and low exothermic properties (low fuel consumption ratio) of the vulcanized rubber may be prevented.

The antiaging agent may include, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate of diphenylamine and acetone at a high temperature, in an amount of 0.1 parts by weight to 6 parts by weight based on 100 parts by weight of the rubber component.

The rubber composition according to an embodiment of the present invention may be obtained by kneading using a kneader such as a banbury mixer, a roll, and an internal mixer according to a compounding prescription. A rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, the present invention provides a tire manufactured using the rubber composition.

The tire may include a tire or a tire tread.

EXAMPLES

Hereinafter, the present invention will be explained in more detail referring to embodiments. However, the embodiments below are only illustrations, and the scope of the present invention should not be limited thereto.

Preparation Example 1

(1) Preparation of $N^1,N^1$-dimethyl-$N^3$-(3-(trimethoxysilyl)propyl)propan-1,3-diamine To a 1 L, round-bottom flask connected with a schlenk line, 1.22 g (10 mmol) of 3-chloro-N,N-dimethylpropan-1-amine and 3.59 g (20 mmol) of 3-(trimethoxysilyl)propan-1-amine were added, and water was completely removed under a reduced pressure. Then, under an argon atmosphere, 500 ml of pyridine was added thereto and reacted for 10 hours while refluxing to prepare an intermediate, $N^1,N^1$-dimethyl-$N^3$-(3-(trimethoxysilyl)propyl)propan-1,3-diamine (yield 80%). After purification, 1H nuclear magnetic resonance spectroscopic spectrum was observed, and the synthesis was confirmed.

$^1$H NMR (CDCl$_3$, 500 MHz): δ 3.55 (s, 9H), 2.53-2.55 (m, 4H), 2.36-2.40 (m, 2H), 2.15 (s, 6H), 1.53-1.60 (m, 2H), 1.50 (s, 1H), 1.33-1.39 (m, 2H), 0.50-0.56 (m, 2H).

(2) Preparation of $N^1,N^1$-(piperazine-1,4-diylbis(propan-3,1-diyl))bis($N^3,N^3$-dimethyl-$N^1$-(3-(trimethoxysilyl)propyl)propan-1,3-diamine)

To a 1 L, round-bottom flask connected with a schlenk line, 1.20 g (5 mmol) of 1,4-bis(3-chloropropyl)piperazine and 5.29 g (20 mmol) of $N^1,N^1$-dimethyl-$N^3$-(3-(trimethoxysilyl)propyl)propan-1,3-diamine prepared in (1) above were added, and water was completely removed under a reduced pressure. Then, under an argon atmosphere, 500 ml of pyridine was added thereto and reacted for 24 hours while refluxing to prepare $N^1,N^1$-(piperazine-1,4-diylbis(propan-3,1-diyl))bis($N^3,N^3$-dimethyl-$N^1$-(3-(trimethoxysilyl)propyl)propan-1,3-diamine) represented by Formula 1-1 below (yield 55%). After purification, 1H nuclear magnetic resonance spectroscopic spectrum was observed, and the synthesis was confirmed.

[Formula 1-1]

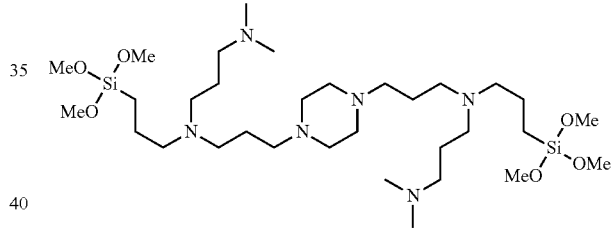

In Formula 1-1, Me is a methyl group.

$^1$H NMR (CDCl$_3$, 500 MHz): δ 3.55 (s, 9H), 2.43-2.48 (m, 4H), 2.36-2.40 (m, 2H), 2.15 (s, 6H), 1.53-1.60 (m, 2H), 1.50 (s, 1H), 1.33-1.39 (m, 2H), 0.50-0.56 (m, 4H).

Preparation Example 2

(1) Preparation of $N^1$-(3-(dimethoxy(methyl)silyl)propyl)-$N^3,N^3$-dimethylpropan-1,3-diamine To a 1 L, round-bottom flask connected with a schlenk line, 1.22 g (10 mmol) of 3-chloro-N,N-dimethylpropan-1-amine and 3.27 g (20 mmol) of 3-(dimethoxy(methyl)silyl)propan-1-amine were added, and water was completely removed under a reduced pressure. Then, under an argon atmosphere, 500 ml of pyridine was added thereto and reacted for 10 hours while refluxing to prepare an intermediate, $N^1$-(3-(dimethoxy(methyl)silyl)propyl)-$N^3,N^3$-dimethylpropan-1,3-diamine (yield 80%). After purification, 1H nuclear magnetic resonance spectroscopic spectrum was observed, and the synthesis was confirmed.

$^1$H NMR (CDCl$_3$, 500 MHz): δ 3.55 (s, 9H), 2.53-2.55 (m, 4H), 2.36-2.40 (m, 2H), 2.15 (s, 6H), 1.53-1.60 (m, 2H), 1.50 (s, 1H), 1.33-1.39 (m, 2H), 0.59-0.62 (m, 2H), 0.15 (s, 3H).

(2) Preparation of N¹,N¹-(piperazine-1,4-diylbis(propan-3,1-diyl))bis(N¹-(3-(dimethoxy(methyl)silyl)propyl)-N³,N³-dimethylpropan-1,3-diamine)

To a 1 L, round-bottom flask connected with a schlenk line, 1.20 g (5 mmol) of 1,4-bis(3-chloropropyl)piperazine and 4.96 g (20 mmol) of N¹-(3-(dimethoxy(methyl)silyl)propyl)-N³,N³-dimethylpropan-1,3-diamine prepared in (1) above were added, and water was completely removed under a reduced pressure. Then, under an argon atmosphere, 500 ml of pyridine was added thereto and reacted for 24 hours while refluxing to prepare N¹,N¹-(piperazine-1,4-diylbis(propan-3,1-diyl))bis(N³,N³-dimethyl-N¹-(3-(trimethoxysilyl)propyl)propan-1,3-diamine) represented by Formula 1-2 below (yield 55%). After purification, 1H nuclear magnetic resonance spectroscopic spectrum was observed, and the synthesis was confirmed.

[Formula 1-2]

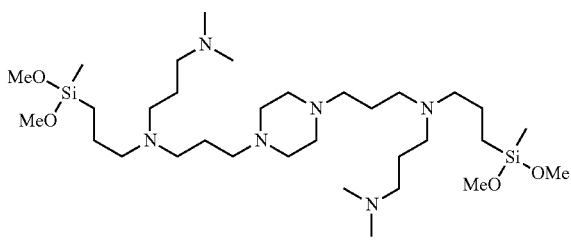

In Formula 1-1, Me is a methyl group.
¹H NMR (CDCl₃, 500 MHz): δ 3.55 (s, 12H), 2.43-2.48 (m, 4H), 2.36-2.40 (m, 16H), 2.27-2.31 (m, 8H), 2.15 (s, 12H), 1.53-1.60 (m, 8H), 1.33-1.39 (m, 4H), 0.59-0.62 (m, 4H), 0.15 (s, 6H).

Preparation Example 3

1) Preparation of N¹,N¹-dimethyl-N³-(3-(trimethoxysilyl)propyl)propan-1,3-diamine Intermediate, N¹,N¹-dimethyl-N³-(3-(trimethoxysilyl)propyl)propan-1,3-diamine was prepared by performing the same method as in (1) of Preparation Example 1 (yield 80%). After purification, 1H nuclear magnetic resonance spectroscopic spectrum was observed, and the synthesis was confirmed.
¹H NMR (CDCl₃, 500 MHz): δ 3.55 (s, 9H), 2.53-2.55 (m, 4H), 2.36-2.40 (m, 2H), 2.15 (s, 6H), 1.53-1.60 (m, 2H), 1.50 (s, 1H), 1.33-1.39 (m, 2H), 0.50-0.56 (m, 2H).

(2) Preparation of N¹,N¹-(pyrazine-1,4-diylbis(propan-3,1-diyl))bis(N³,N³-dimethyl-N¹-(3-(trimethoxysilyl)propyl)propan-1,3-diamine)

To a 1 L, round-bottom flask connected with a schlenk line, 1.18 g (5 mmol) of 1,4-bis(3-chloropropyl)-1,4-dihydropyrazine and 5.29 g (20 mmol) of N¹,N¹-dimethyl-N³-(3-(trimethoxysilyl)propyl)propan-1,3-diamine prepared in (1) above were added, and water was completely removed under a reduced pressure. Then, under an argon atmosphere, 500 ml of pyridine was added thereto and reacted for 24 hours while refluxing to prepare N¹,N¹-(pyrazine-1,4-diylbis(propan-3,1-diyl))bis(N³,N³-dimethyl-N¹-(3-(trimethoxysilyl)propyl)propan-1,3-diamine) represented by Formula 1-3 below (yield 50%). After purification, 1H nuclear magnetic resonance spectroscopic spectrum was observed, and the synthesis was confirmed.

[Formula 1-3]

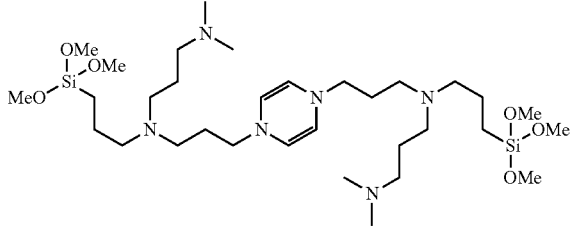

In Formula 1-3, Me is a methyl group.
¹H NMR (CDCl₃, 500 MHz): δ 5.45 (s, 4H), 3.55 (s, 18H), 2.43-2.48 (m, 4H), 2.36-2.40 (m, 16H), 2.15 (s, 12H), 1.53-1.60 (m, 8H), 1.33-1.39 (m, 4H), 0.50-0.56 (m, 4H).

Preparation Example 4

1) Preparation of N',N¹-dimethyl-N³-(3-(trimethoxysilyl)propyl)propan-1,3-diamine An intermediate, N',N¹-dimethyl-N³-(3-(trimethoxysilyl)propyl)propan-1,3-diamine was prepared by performing the same method as in (1) of Preparation Example 1 (yield 80%). After purification, ¹H nuclear magnetic resonance spectroscopic spectrum was observed, and the synthesis was confirmed.
¹H NMR (CDCl₃, 500 MHz): δ 3.55 (s, 9H), 2.53-2.55 (m, 4H), 2.36-2.40 (m, 2H), 2.15 (s, 6H), 1.53-1.60 (m, 2H), 1.50 (s, 1H), 1.33-1.39 (m, 2H), 0.50-0.56 (m, 2H)

(2) Preparation of N¹,N¹-(imidazolidine-1,3-diylbis(propan-3,1-diyl))bis(N³,N³-dimethyl-N¹-(3-(trimethoxysilyl)propyl)propan-1,3-diamine)

To a 1 L, round-bottom flask connected with a schlenk line, 1.13 g (5 mmol) of 1,3-bis(3-chloropropyl)imidazolidine and 5.29 g (20 mmol) of N¹,N¹-dimethyl-N³-(3-(trimethoxysilyl)propyl)propan-1,3-diamine prepared in (1) above were added, and water was completely removed under a reduced pressure. Then, under an argon atmosphere, 500 ml of pyridine was added thereto and reacted for 24 hours while refluxing to prepare N¹,N¹-(imidazolidine-1,3-diylbis(propan-3,1-diyl))bis(N³,N³-dimethyl-N¹-(3-(trimethoxysilyl)propyl)propan-1,3-diamine) represented by Formula 1-7 below (yield 59%). After purification, 1H nuclear magnetic resonance spectroscopic spectrum was observed, and the synthesis was confirmed.

[Formula 1-7]

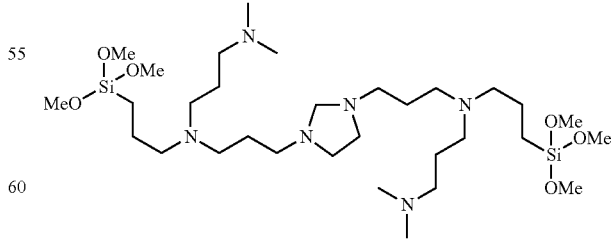

In Formula 1-7, Me is a methyl group.
¹H NMR (CDCl₃, 500 MHz): δ 3.55 (s, 18H), 3.45 (s, 2H), 2.43-2.48 (m, 8H), 2.36-2.40 (m, 16H), 2.15 (s, 12H), 1.53-1.60 (m, 8H), 1.33-1.39 (m, 4H), 0.50-0.56 (m, 4H).

Preparation Example 5

1) Preparation of $N^1$-(3-(dimethoxy(methyl)silyl)propyl)-$N^3,N^3$-dimethylpropan-1,3-diamine An intermediate, $N^1$-(3-(dimethoxy(methyl)silyl)propyl)-$N^3,N^3$-dimethylpropan-1,3-diamine was prepared by performing the same method as in (1) of Preparation Example 2 (yield 80%). After purification, 1H nuclear magnetic resonance spectroscopic spectrum was observed, and the synthesis was confirmed.

$^1$H NMR (CDCl$_3$, 500 MHz): δ 3.55 (s, 9H), 2.53-2.55 (m, 4H), 2.36-2.40 (m, 2H), 2.15 (s, 6H), 1.53-1.60 (m, 2H), 1.50 (s, 1H), 1.33-1.39 (m, 2H), 0.59-0.62 (m, 2H), 0.15 (s, 3H).

(2) Preparation of $N^1,N^1$-((1H-imidazole-1,3(2H)-diyl)bis(propan-3,1-diyl))bis($N^1$-(3-(dimethoxy(methyl)silyl)propyl)-$N^3,N^3$-dimethylpropan-1,3-diamine)

To a 1 L, round-bottom flask connected with a schlenk line, 1.12 g (5 mmol) of 1,3-bis(3-chloropropyl)-2,3-dihydro-1H-imidazole and 4.96 g (20 mmol) of $N^1$-(3-(dimethoxy(methyl)silyl)propyl)-$N^3,N^3$-dimethylpropan-1,3-diamine prepared in (1) above were added, and water was completely removed under a reduced pressure. Then, under an argon atmosphere, 500 ml of pyridine was added thereto and reacted for 24 hours while refluxing to prepare $N^1,N^1$-((1H-imidazole-1,3 (2H)-diyl)bis(propan-3,1-diyl))bis($N^1$-(3-(dimethoxy(methyl)silyl)propyl)-$N^3,N^3$-dimethylpropan-1,3-diamine) represented by Formula 1-10 below (yield 52%). After purification, 1H nuclear magnetic resonance spectroscopic spectrum was observed, and the synthesis was confirmed.

[Formula 1-10]

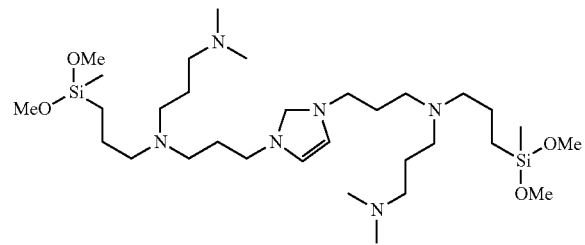

In Formula 1-10, Me is a methyl group.

$^1$H NMR (CDCl$_3$, 500 MHz): δ 4.99 (s, 2H), 4.86 (s, 4H), 3.55 (s, 18H), 3.45 (s, 2H), 2.43-2.48 (m, 4H), 2.36-2.40 (m, 12H), 2.15 (s, 12H), 1.53-1.60 (m, 8H), 1.33-1.39 (m, 4H), 0.50-0.56 (m, 4H).

EXAMPLES

Example 1

To a 20 L, autoclave reactor, 270 g of styrene, 710 g of 1,3-butadiene, 5,000 g of n-hexane and 0.9 g of 2,2-di (tetrahydrofuryl)propane as a polar additive were added, and the internal temperature of the reactor was elevated to 40° C. After the internal temperature of the reactor reached 40° C., 4.3 mmol of n-butyllithium was injected into the reactor, and an adiabatic reaction with heating was performed. After finishing the adiabatic reaction with heating, and after about 20 minutes lapse, 20 g of 1,3-butadiene was injected for capping the terminals of a polymer with butadiene. After about 5 minutes, 2.85 g (4.3 mmol) of $N^1,N^{1'}$-(piperazine-1,4-diylbis(propane-3,1-diyl))bis($N^1$-(3-(dimethoxy(methyl)silyl)propyl)-$N^3,N^3$-dimethylpropane-1,3-diamine) represented by Formula 1-2 prepared in Preparation Example 2 was injected as a modifier and reacted for 15 minutes. Then, the reaction was quenched using ethanol, and 45 ml of a solution in which 0.3 wt % of butylated hydroxytoluene (BHT) antioxidant was dissolved in hexane was added thereto. The polymer thus obtained was injected into hot water heated using steam and stirred to remove solvents and roll dried to remove remaining solvents and water to prepare a modified conjugated diene-based polymer.

Example 2

A modified conjugated diene-based polymer was prepared by performing the same method as in Example 1 except for injecting 4.3 mmol of N1,N1'-(piperazine-1,4-diylbis(propan-3,1-diyl))bis(N3,N3-dimethyl-N1-(3-(trimethoxysilyl)propyl)propan-1,3-diamine) represented by Formula 1-1, prepared in Preparation Example 1, as a modifier.

Example 3

A modified conjugated diene-based polymer was prepared by performing the same method as in Example 1 except for injecting 4.3 mmol of N1,N1'-(pyrazine-1,4-diylbis(propan-3,1-diyl))bis(N3,N3-dimethyl-N1-(3-(trimethoxysilyl)propyl)propan-1,3-diamine) represented by Formula 1-3, prepared in Preparation Example 3, as a modifier.

Example 4

A modified conjugated diene-based polymer was prepared by performing the same method as in Example 1 except for injecting 4.3 mmol of N1,N1'-(imidazolidine-1,3-diylbis(propan-3,1-diyl))bis(N3,N3-dimethyl-N1-(3-(trimethoxysilyl)propyl)propan-1,3-diamine) represented by Formula 1-7, prepared in Preparation Example 4, as a modifier.

Example 5

A modified conjugated diene-based polymer was prepared by performing the same method as in Example 1 except for injecting 4.3 mmol of N1,N1'-(1H-imidazole-1,3(2H)-diyl)bis(propan-3,1-diyl))bis(N1-(3-(dimethoxy(methyl)silyl)propyl)-N3,N3-dimethylpropan-1,3-diamine) represented by Formula 1-10, prepared in Preparation Example 5, as a modifier.

Comparative Example 1

To a 20 L, autoclave reactor, 270 g of styrene, 710 g of 1,3-butadiene, 5,000 g of n-hexane and 0.9 g of 2,2-di (tetrahydrofuryl)propane as a polar additive were added, and the internal temperature of the reactor was elevated to 40° C. After the internal temperature of the reactor reached 40° C., 4.3 mmol of n-butyllithium was injected, and an adiabatic reaction with heating was performed. After finishing the adiabatic reaction with heating, and after about 20 minutes lapse, 20 g of 1,3-butadiene was injected for capping the terminals of a polymer with butadiene. After about 5 minutes, 4 mmol of dichlorodimethylsilane was injected and reacted for 15 minutes. Then, the reaction was quenched using ethanol, and 45 ml of a solution in which 0.3 wt % of butylated hydroxytoluene (BHT) antioxidant was dissolved in hexane was added thereto. The polymer thus obtained was injected into hot water heated using steam and stirred to remove solvents and roll dried to remove remaining solvents and water to prepare a modified conjugated diene-based polymer. Here, the dichlorodimethylsilane was used for obtaining a polymer having the similar degree of a molecular weight as Example 1.

Comparative Example 2

A modified conjugated diene-based polymer was prepared by performing the same method as in Example 1 except for injecting 4.3 mmol of 1,4-bis(3-(triethoxysilyl)propyl)piperazine as a modifier.

Comparative Example 3

A modified conjugated diene-based polymer was prepared by performing the same method as in Example 1 except for injecting 2.3 g (4.3 mmol) of N-(3-(1H-imidazol-1-yl)propyl)-3-(triethoxysilyl)-N-(3-(triethoxysilyl)propyl)propan-1-amine.

Comparative Example 4

A modified conjugated diene-based polymer was prepared by performing the same method as in Example 1 except for injecting 4.3 mmol of 3-(4-methylpiperazin-1-yl)-N,N-bis(3-(triethoxysilyl)propyl)propan-1-amine as a modifier.

Comparative Example 5

A modified conjugated diene-based polymer was prepared by performing the same method as in Example 1 except for injecting 6.5 mmol of 1-(3-(dimethoxy(methyl)silyl)propyl)-4-methylpiperazine as a modifier.

Experimental Examples

Experimental Example 1

With respect to each of the modified or unmodified conjugated diene-based polymers prepared in the Examples and the Comparative Examples, a weight average molecular weight (Mw, ×10$^3$ g/mol), a number average molecular weight (Mn, ×10$^3$ g/mol), molecular weight distribution (MWD), and mooney viscosity (MV) were measured, respectively. The results are shown in Table 1 below.

The weight average molecular weight (Mw) and the number average molecular weight (Mn) were measured through gel permeation chromatography (GPC) analysis, and the molecular weight distribution (MWD, Mw/Mn) was calculated from each molecular weight thus measured. Particularly, GPC was conducted using two columns of PLgel Olexis (Polymer Laboratories Co.) and one column of PLgel mixed-C (Polymer Laboratories Co.) in combination, and newly replaced columns were all mixed bed type columns. For calculating the molecular weight, polystyrene (PS) was used as a GPC standard material.

The mooney viscosity (MV, (ML1+4, @100° C. MU) was measured using MV-2000 (ALPHA Technologies Co.) using Large Rotor at a rotor speed of 2±0.02 rpm at 100° C. In this case, a specimen used was stood at room temperature (23±5° C.) for 30 minutes or more, and 27±3 g was collected and put in a die cavity, and then, Platen was operated for 4 minutes for measurement.

As shown in Table 1 above, the modified conjugated diene-based polymers of Examples 1 to 5 showed largely increased weight average molecular weights in contrast to the unmodified conjugated diene-based polymer of Comparative Example 1. From the results, the polymers of Example 1 to Example 5 according to embodiments of the present invention were expected to be modified.

Experimental Example 2

In order to compare and analyze the physical properties of rubber compositions including the modified or unmodified conjugated diene-based copolymers prepared in the Examples and the Comparative Examples, and molded products manufactured therefrom, tensile properties, abrasion resistance and wet skid resistance were measured, respectively, and the results are shown in Table 3 below.

1) Preparation of Rubber Specimen

Blending was performed using each of the modified or unmodified conjugated diene-based polymers of the Examples and the Comparative Examples as raw material rubbers according to the compounding conditions shown in Table 2 below. The raw materials in Table 2 are represented by parts by weight based on 100 parts by weight of rubber.

TABLE 2

| Division | Raw material | Amount (parts by weight) |
|---|---|---|
| First stage kneading | Rubber | 100 |
| | Silica | 70 |
| | Coupling agent | 11.2 |
| | Process oil | 25 |
| | Zinc white | 3 |
| | Stearic acid | 2 |
| | Antioxidant | 2 |
| | Antiaging agent | 2 |
| | wax | 1 |
| Second stage kneading | Sulfur | 1.5 |
| | Rubber accelerator | 1.75 |
| | Vulcanization accelerator | 2 |

Particularly, the rubber specimen was kneaded via a first stage kneading and a second stage kneading. In the first stage kneading, a raw material rubber, silica (filler), an organic silane coupling agent (X50S, Evonik), a process oil (TDAE oil), zinc white (ZnO), stearic acid, an antioxidant (TMQ (RD)) (2,2,4-trimethyl-1,2-dihydroquinoline polymer), an antiaging agent (6PPD ((dimethylbutyl)-N-phenyl-phenylenediamine) and wax (Microcrystaline Wax) were kneaded using a banbury mixer equipped with a temperature controlling apparatus. In this case, the temperature of a kneader was controlled, and a first compound mixture was obtained at a discharge temperature of 150° C. In the second stage kneading, the first compound mixture was cooled to

TABLE 1

| | Example | | | | | Comparative Example | | | | |
|---|---|---|---|---|---|---|---|---|---|---|
| Division | 1 | 2 | 3 | 4 | 5 | 1 | 2 | 3 | 4 | 5 |
| Mw (×10$^3$ g/mol) | 440 | 480 | 462 | 477 | 447 | 390 | 450 | 430 | 430 | 415 |
| Mn (×10$^3$ g/mol) | 330 | 340 | 342 | 351 | 339 | 310 | 330 | 310 | 320 | 312 |
| Mw/Mn | 1.33 | 1.38 | 1.35 | 1.36 | 1.32 | 1.25 | 1.35 | 1.38 | 1.32 | 1.33 |
| MV | 72 | 74 | 72 | 74 | 73 | 65 | 72 | 70 | 70 | 68 | room temperature, and the first compound mixture, a sulfur powder, a rubber accelerator (diphenylguanine (DPG)), and a vulcanization accelerator (N-cyclohexyl-2-benzothiazylsulfenamide (CZ)) were added to the kneader and mixed at a temperature of 100° C. or less to obtain a second compound mixture. Then, via a curing process at 160° C. for 20 minutes, a rubber specimen was formed.

2) Tensile Properties

For measuring the tensile properties, each test specimen was manufactured and tensile strength when broken and tensile stress when stretched by 300% (300% modulus) of each specimen were measured according to an ASTM 412 tensile test method. Particularly, tensile properties were measured using a Universal Test Machin 4204 tensile tester (Instron Co.) in a rate of 50 cm/min at room temperature.

3) Viscoelasticity Properties

The viscoelasticity properties were obtained by measuring tan δ on deformation at each measurement temperature (−60° C. to 60° C.) with a frequency of 10 Hz in a twist mode by using a dynamic mechanical analyzer (TA Co.). Payne effects were shown by a difference between a minimum value and a maximum value at a deformation of 0.28% to 40%. If a tan δ at a low temperature of 0° C. increases, wet skid resistance becomes better, and if a tan δ at a high temperature of 60° C. decreases, hysteresis loss decreases, and rotation resistance (fuel consumption ratio) becomes better. The resultant values in Table 3 were indexed based on the measurement values of Comparative Example 1, and the higher value means better results.

4) Processability Properties

By measuring the mooney viscosity (MV, (ML1+4, at 100° C. MU) of the second compound mixture obtained during 1) preparation of rubber specimen, the processability properties of each polymer were compared and analyzed, and in this case, the lower the measured value of the moony viscosity is, the better the processability properties are. The resultant values in Table 3 were indexed based on the measurement values of Comparative Example 1, and the higher value means better results.

Particularly, by using MV-2000 (ALPHA Technologies Co.) and using Large Rotor at a rotor speed of 2±0.02 rpm at 100° C., each secondary compound mixture was stood at room temperature (23±5° C.) for 30 minutes or more, and 27±3 g was collected and put in a die cavity, and then, Platen was operated for 4 minutes for measurement.

As shown in Table 3, it was confirmed that the processability of Example 1 to Example 5 were excellent to a similar degree as Comparative Example 1 which corresponded to an unmodified polymer, while the wet skid resistance was improved, and tensile properties and rotation resistance were markedly excellent.

Through this, it could be found that the modified conjugated diene-based polymer of the present invention was modified by the modifier represented by Formula 1 and included a functional group derived from the modifier, and accordingly, showed markedly improved effects of tensile properties and viscoelasticity properties in contrast to a polymer not including the functional group.

In addition, Example 1 to Example 5 showed somewhat improved processability properties and wet skid resistance and at the same time, markedly improved effects of tensile properties and low running resistance in contrast to Comparative Example 2 to Comparative Example 5, and in this case, Comparative Example 2 to Comparative Example 5 were modified using a modifier including a heterocyclic group, an amino group and an alkoxysilane group but not including the structure of the modifier represented by Formula 1 suggested in the present invention, which included a heterocyclic group containing two N atoms as a core and additionally four amino groups and two alkoxysilane groups in a molecule. Through this, it could be found that the modified conjugated diene-based polymer of the present invention was modified by the modifier represented by Formula 1 and showed marked effects which could not be achieved by a polymer modified by other modifiers having a similar structure.

The invention claimed is:

1. A modified conjugated diene-based polymer, comprising:
    a repeating unit derived from a conjugated diene-based monomer; and
    a functional group derived from a modifier represented by the following Formula 1 in at least one terminal of the modified conjugated diene-based polymer:

[Formula 1]

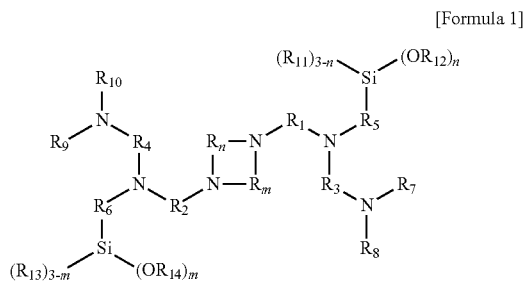

TABLE 3

|  |  | Example | | | | | Comparative Example | | | | |
| --- | --- | --- | --- | --- | --- | --- | --- | --- | --- | --- | --- |
| Division |  | 1 | 2 | 3 | 4 | 5 | 1 | 2 | 3 | 4 | 5 |
| Tensile properties (kgf/cm²) | 300% modulus | 184 | 188 | 184 | 185 | 181 | 168 | 175 | 174 | 179 | 172 |
|  | Tensile strength | 119 | 122 | 120 | 121 | 117 | 104 | 109 | 107 | 115 | 109 |
| Viscoelasticity properties (Index, %) | tan δ @0° C. | 104 | 105 | 103 | 102 | 101 | 100 | 101 | 103 | 102 | 101 |
|  | tan δ @60° C. | 128 | 130 | 128 | 126 | 125 | 100 | 108 | 110 | 115 | 109 |
| Processability properties (Index, %) |  | 98 | 97 | 97 | 96 | 96 | 100 | 92 | 93 | 93 | 96 | in Formula 1,

R$_1$ to R$_6$ are each independently an alkylene group of 1 to 20 carbon atoms, an alkenylene group of 2 to 20 carbon atoms, an alkynylene group of 2 to 20 carbon atoms, a cycloalkylene group of 5 to 30 carbon atoms, a cycloalkenylene group of 5 to 30 carbon atoms, a heteroalkylene group of 1 to 20 carbon atoms, an arylene group of 6 to 30 carbon atoms, or a heteroarylene group of 5 to 30 carbon atoms, R$_7$ to R$_{10}$ are each independently an alkyl group of 1 to 20 carbon atoms, an alkenyl group of 2 to 20 carbon atoms, an alkynyl group of 2 to 20 carbon atoms, a cycloalkyl group of 5 to 30 carbon atoms, a cycloalkenyl group of 5 to 30 carbon atoms, a heteroalkyl group of 1 to 20 carbon atoms, an aryl group of 6 to 30 carbon atoms, a heteroaryl group of 5 to 30 carbon atoms, or —R$_{a1}$—Si(OR$_{a2}$)$_a$(R$_{a3}$)$_{3-a}$, where R$_{a1}$ is an alkylene group of 1 to 10 carbon atoms, R$_{a2}$ and R$_{a3}$ are alkyl groups of 1 to 10 carbon atoms, and a is an integer selected from 0 to 3, R$_{11}$ to R$_{14}$ are each independently an alkyl group of 1 to 20 carbon atoms, or an aryl group of 6 to 20 carbon atoms, R$_m$ and R$_n$ are each independently an alkylene group of 1 to 3 carbon atoms, or an alkenylene group of 2 to 4 carbon atoms, m and n are integers selected from 1 to 3, and a hydrocarbon group or a hetero hydrocarbon group defined in R$_{11}$ to R$_{14}$, R$_m$ and R$_n$ is unsubstituted or substituted with a substituent, wherein the substituent is an alkyl group of 1 to 10 carbon atoms, an alkenyl group of 2 to 10 carbon atoms, an alkynyl group of 2 to 10 carbon atoms, a cycloalkyl group of 5 to 20 carbon atoms, a cycloalkenyl group of 5 to 20 carbon atoms, a heteroalkyl group of 1 to 10 carbon atoms, an aryl group of 6 to 20 carbon atoms, or a heteroaryl group of 5 to 20 carbon atoms.

2. The modified conjugated diene-based polymer of claim 1, wherein in Formula 1, R$_1$ to R$_6$ are each independently an alkylene group of 1 to 10 carbon atoms, a cycloalkylene group of 5 to 20 carbon atoms, a heteroalkylene group of 1 to 10 carbon atoms, an arylene group of 6 to 20 carbon atoms, or a heteroarylene group of 5 to 20 carbon atoms.

3. The modified conjugated diene-based polymer of claim 1, wherein in Formula 1, R$_7$ to R$_{10}$ are each independently is an alkyl group of 1 to 10 carbon atoms, a cycloalkyl group of 5 to 20 carbon atoms, a heteroalkyl group of 1 to 10 carbon atoms, an aryl group of 6 to 20 carbon atoms, a heteroaryl group of 5 to 20 carbon atoms, or —R$_{a1}$—Si(OR$_{a2}$)$_a$(R$_{a3}$)$_{3-a}$, where R$_{a1}$ is an alkylene group of 1 to 5 carbon atoms, R$_{a2}$ and R$_{a3}$ are alkyl groups of 1 to 5 carbon atoms, and a is an integer selected from 1 to 3.

4. The modified conjugated diene-based polymer of claim 1, wherein the compound represented by Formula 1 is one or more selected from compounds represented by the following Formula 1a to Formula 1e:

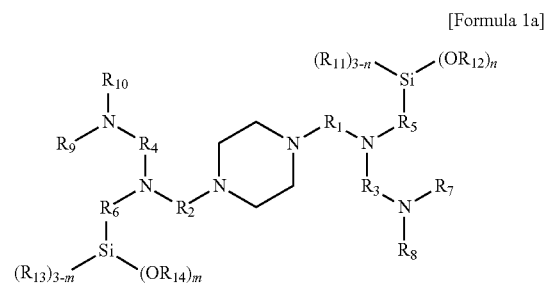

[Formula 1a]

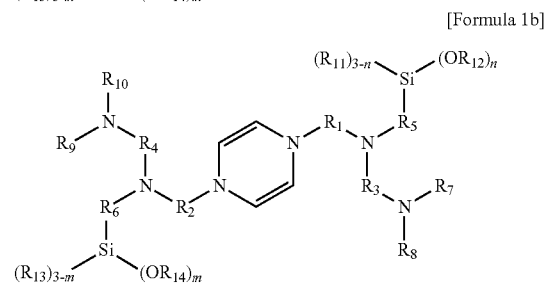

[Formula 1b]

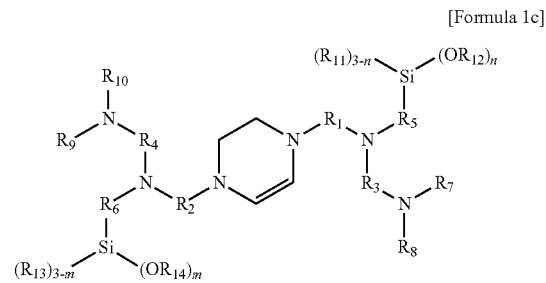

[Formula 1c]

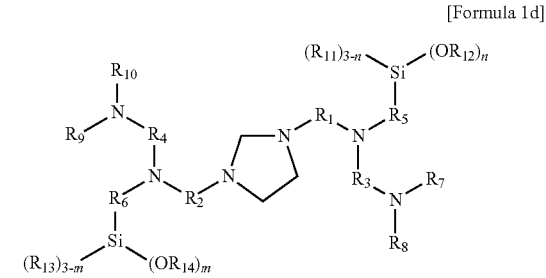

[Formula 1d]

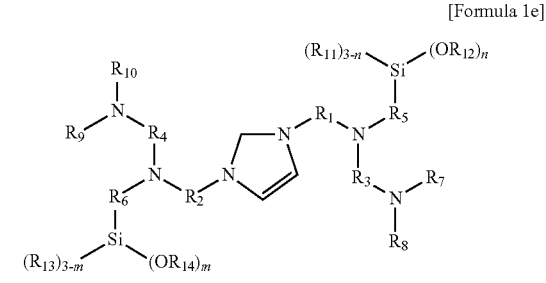

[Formula 1e]

in Formula 1a to Formula 1e above, the definition of R$_{11}$ to R$_{14}$, m and n is the same as defined in Formula 1.

5. The modified conjugated diene-based polymer of claim 1, wherein in Formula 1, R$_1$ to R$_6$ are each independently an alkylene group of 1 to 10 carbon atoms, a cycloalkylene group of 5 to 20 carbon atoms, or an arylene group of 6 to 20 carbon atoms, R₇ to R₁₀ are each independently an alkyl group of 1 to 10 carbon atoms, a cycloalkyl group of 5 to 20 carbon atoms, or an aryl group of 6 to 30 carbon atoms, R₁₁ to R₁₄ are each independently an alkyl group of 1 to 10 carbon atoms, R_m and R_n are each independently a methylene group, an ethylene group, or an ethenylene group, and m and n are integers selected from 1 to 3.

6. The modified conjugated diene-based polymer of claim 1, further comprising a repeating unit derived from an aromatic vinyl monomer.

7. The modified conjugated diene-based polymer according to claim 1, wherein a weight average molecular weight (Mw) ranges from 10,000 g/mol to 2,000,000 g/mol.

8. The modified conjugated diene-based polymer of claim 1, wherein molecular weight distribution (Mw/Mn) ranges from 1.0 to 8.0.

9. A modifier represented by the following Formula 1:

[Formula 1]

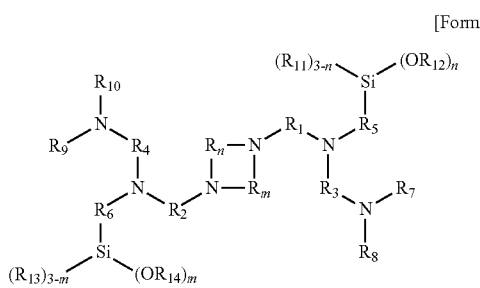

in Formula 1,

R₁ to R₆ are each independently an alkylene group of 1 to 20 carbon atoms, an alkenylene group of 2 to 20 carbon atoms, an alkynylene group of 2 to 20 carbon atoms, a cycloalkylene group of 5 to 30 carbon atoms, a cycloalkenylene group of 5 to 30 carbon atoms, a heteroalkylene group of 1 to 20 carbon atoms, an arylene group of 6 to 30 carbon atoms, or a heteroarylene group of 5 to 30 carbon atoms, R₇ to R₁₀ are each independently an alkyl group of 1 to 20 carbon atoms, an alkenyl group of 2 to 20 carbon atoms, an alkynyl group of 2 to 20 carbon atoms, a cycloalkyl group of 5 to 30 carbon atoms, a cycloalkenyl group of 5 to 30 carbon atoms, a heteroalkyl group of 1 to 20 carbon atoms, an aryl group of 6 to 30 carbon atoms, a heteroaryl group of 5 to 30 carbon atoms, or —R_{a1}—Si(OR_{a2})_a(R_{a3})_{3-a}, where R_{a1} is an alkylene group of 1 to 10 carbon atoms, R_{a2} and R_{a3} are alkyl groups of 1 to 10 carbon atoms, and a is an integer selected from 0 to 3, R₁₁ to R₁₄ are each independently an alkyl group of 1 to 20 carbon atoms, or an aryl group of 6 to 20 carbon atoms, R_m and R_n are each independently an alkylene group of 1 to 3 carbon atoms, or an alkenylene group of 2 to 4 carbon atoms, m and n are integers selected from 1 to 3, and a hydrocarbon group or a hetero hydrocarbon group defined in R₁₁ to R₁₄, R_m and R_n is unsubstituted or substituted with a substituent, wherein the substituent is an alkyl group of 1 to 10 carbon atoms, an alkenyl group of 2 to 10 carbon atoms, an alkynyl group of 2 to 10 carbon atoms, a cycloalkyl group of 5 to 20 carbon atoms, a cycloalkenyl group of 5 to 20 carbon atoms, a heteroalkyl group of 1 to 10 carbon atoms, an aryl group of 6 to 20 carbon atoms, or a heteroaryl group of 5 to 20 carbon atoms.

10. The modifier of claim 4, wherein the compound represented by Formula 1 is one or more selected from compounds represented by the following Formula 1a to Formula 1e:

[Formula 1a]

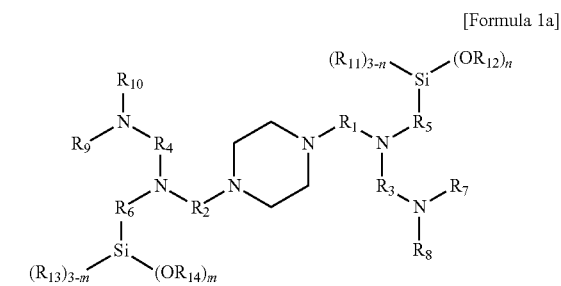

[Formula 1b]

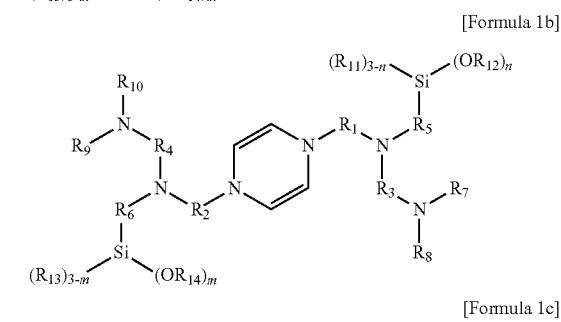

[Formula 1c]

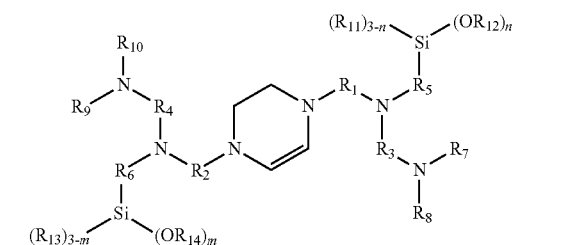

[Formula 1d]

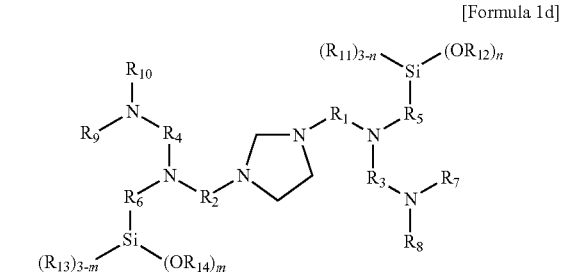

[Formula 1e]

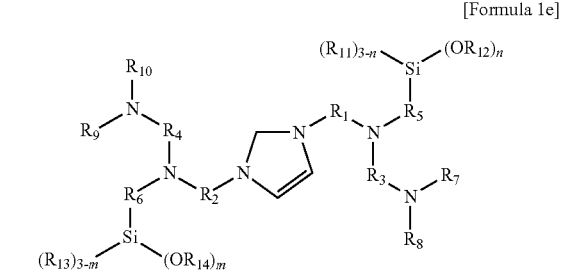

in Formula 1a to Formula 1e, the definition of R₁₁ to R₁₄, m and n is the same as defined in Formula 1.

11. The modifier of claim 9, wherein
in Formula 1,
$R_1$ to $R_6$ are each independently an alkylene group of 1 to 10 carbon atoms, a cycloalkylene group of 5 to 20 carbon atoms, or an arylene group of 6 to 20 carbon atoms,
$R_7$ to $R_{10}$ are each independently an alkyl group of 1 to 10 carbon atoms, a cycloalkyl group of 5 to 20 carbon atoms, or an aryl group of 6 to 30 carbon atoms,
$R_{11}$ to $R_{14}$ are each independently an alkyl group of 1 to 10 carbon atoms,
$R_m$ and $R_n$ are each independently a methylene group, an ethylene group, or an ethenylene group, and
m and n are integers selected from 1 to 3.

* * * * *